United States Patent
Khoo et al.

(10) Patent No.: US 10,534,497 B2
(45) Date of Patent: *Jan. 14, 2020

(54) SYSTEMS AND METHODS FOR BULK REDACTION OF RECORDED DATA

(71) Applicant: Axon Enterprise, Inc., Scottsdale, AZ (US)

(72) Inventors: Aaron Khoo, Bellevue, WA (US); Abraham Alvarez Zayas, Seattle, WA (US); Marcus W. L. Womack, Redmond, WA (US); James N. Reitz, Bainbridge Island, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/101,824

(22) Filed: Aug. 13, 2018

(65) Prior Publication Data

US 2018/0348921 A1    Dec. 6, 2018

Related U.S. Application Data

(63) Continuation of application No. 15/052,557, filed on Feb. 24, 2016, now Pat. No. 10,108,306.
(Continued)

(51) Int. Cl.
*G06F 3/048* (2013.01)
*G06F 16/00* (2019.01)
(Continued)

(52) U.S. Cl.
CPC .............. *G06F 3/048* (2013.01); *G06F 16/00* (2019.01); *G06F 21/6245* (2013.01); *G11B 27/031* (2013.01)

(58) Field of Classification Search
CPC combination set(s) only.
See application file for complete search history.

(56) References Cited

U.S. PATENT DOCUMENTS

| 6,628,329 | B1 * | 9/2003 | Kelly | H04N 5/208 348/188 |
| 7,805,673 | B2 | 9/2010 | Der Quaeler | |

(Continued)

FOREIGN PATENT DOCUMENTS

| JP | 2007318333 A | 12/2007 |
| JP | 2008178054 A | 7/2008 |
| KR | 20130011344 A | 1/2013 |

OTHER PUBLICATIONS

European Patent Office, Extended European Search Report for European Patent Application No. 16756285 dated Jul. 25, 2018.
(Continued)

*Primary Examiner* — Abiy Getachew
(74) *Attorney, Agent, or Firm* — Andrew Graham

(57) ABSTRACT

Systems and methods for redacting information from data records are provided. Data records are recorded by recording devices, including, but not limited to, camera recording devices such as those associated with law-enforcement officers. The data records are stored in an evidence management system. In response to requests for records, including but not limited to Freedom of Information Act (FOIA) requests, the evidence management system creates redacted versions of the data records. Public access may then be provided to the redacted data records. In some embodiments, automated bulk redaction may be applied to video data records by applying a video filter to the entire visual field of the video information. In some embodiments, access to the redacted data records may be provided via a cloud storage system or via a removable computer-readable storage medium.

20 Claims, 9 Drawing Sheets

Related U.S. Application Data

(60) Provisional application No. 62/120,227, filed on Feb. 24, 2015.

(51) Int. Cl.
*G06F 21/62* (2013.01)
*G11B 27/031* (2006.01)

(56) References Cited

U.S. PATENT DOCUMENTS

| | | |
|---|---|---|
| 8,612,854 B2 | 12/2013 | Eisen |
| 9,111,239 B2 | 8/2015 | Minert |
| 2001/0046096 A1 | 11/2001 | Worden |
| 2004/0146272 A1* | 7/2004 | Kessel ............. G08B 13/19647 386/291 |
| 2006/0028488 A1 | 2/2006 | Gabay et al. |
| 2006/0075228 A1 | 4/2006 | Black |
| 2007/0094594 A1 | 4/2007 | Matichuk |
| 2008/0117295 A1 | 5/2008 | Ebrahimi et al. |
| 2009/0262987 A1 | 10/2009 | Ioffe |
| 2010/0023463 A1 | 1/2010 | Walker |
| 2011/0119573 A1 | 5/2011 | Aumann |
| 2014/0012719 A1 | 1/2014 | Schrichte |
| 2014/0104396 A1* | 4/2014 | Salow ................ H04N 21/2743 348/47 |
| 2015/0089663 A1 | 3/2015 | Gile |
| 2015/0220626 A1 | 8/2015 | Carmi |
| 2015/0278535 A1 | 10/2015 | Holman |
| 2015/0286719 A1 | 10/2015 | Sampathkumaran |
| 2015/0363375 A1 | 12/2015 | Pittenger |
| 2015/0363655 A1 | 12/2015 | Artan |
| 2015/0378973 A1 | 12/2015 | Korneev |
| 2016/0012027 A9 | 1/2016 | Rebstock |

OTHER PUBLICATIONS

Brown L et al, "Enabling Video Privacy through Computer Vision", Security & Privacy, IEEE, IEEE Service Center, Los Alamitos, CA, US, vol. 3, No. 3, pp. 50-57.

Michael Boyle et al, "The effects of filtered video on awareness and privacy", ACM Conference on Computer Supported Cooperative Work, New York, NY, ACM, US, Dec. 1, 2000, pp. 1-10.

Schrier, Bill, Inside the Seattle Police Hackathon: A substantial first step, http://www.geekwire.com/author/bill-schrier, Dec. 20, 2014.

* cited by examiner

FIG. 5

XYZ HOMEPAGE

HTTP://WWW.XYZ.COM

File Edit View Favorites Tools Help

DASHBOARD | EVIDENCE | CASES | DEVICES | USERS | REPORTS | SETTINGS | HELP

EVIDENCE SEARCH

ID: 
Date: Recorded Date
Owner:
Tag:

Title:
From: To:
Uploaded By:

Category: Any
File Type: Video
Status: Active
Flagged: Any

View All  Search  — 502

[Update ID] [Add Category] [Reassign] [Redact] [Share] [Download] [Delete] [Restore] [Export]   2 Files Found | 0 files selected   Page Layout

| CATEGORY | TITLE | FILE TYPE | OWNER | UPLOADED BY | UPLOAD DATE | RECORDED DATE▲ | STATUS |

Evidence List

☐  Curb.mp4
☐  Mp4.MP4    ← 504

← 506

Redact audio? ☐
EVIDENCE.com will redact the videos and pack these files into an iso file. We will email (user@xyz.com) with a link to download these files when it's ready. This link will be active for 3 days.

[Cancel]  [Redact]

SYSTEMS AND METHODS FOR BULK REDACTION OF RECORDED DATA

BACKGROUND

It is becoming increasingly popular to record video during law enforcement activities, such as by using wearable cameras, in-car dash cameras, and/or the like. Even though large amounts of video may be collected using these techniques, the videos are often subject to disclosure under the Freedom of Information Act (FOIA) or similar laws or policies. To comply with such laws while maintaining the privacy of depicted individuals, sensitive information is commonly redacted from the videos before disclosure.

Public agencies are becoming inundated with FOIA requests once video capture is rolled out. Using existing tools, it often takes several hours to redact a few minutes of video, as video data must be reviewed and redacted for minors, undercover officers, innocent bystanders, and other sensitive information. Furthermore, audio data also must be redacted for names, addresses, and any other sensitive information. It has become such a huge burden that some public agencies have publicly stated that they are considering ending video capture projects as they cannot support the requests. What is needed are methods and systems that help reduce the amount of time needed to redact videos in response to public records requests.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for processing digital video data is provided. The system comprises at least one digital video camera and at least one computing device configured to provide an evidence management system. The evidence management system is configured to receive one or more digital video files from the at least one digital video camera; store the digital video files in a storage location protected from public access; redact information from the digital video files to create redacted digital video files; and store the redacted digital video files in a storage location available to public access. Redacting information from the digital video files includes applying a blur filter to an entirety of visual content of the digital video files.

In some embodiments, a computer-implemented method for automatically redacting records captured by recording devices is provided. A computing device receives a command to redact a data record, wherein the data record includes a digital video file. The computing device applies a blur filter to an entire visual field of the digital video file to create a redacted data record. The computing device stores the redacted data record in a staging location, and access to redacted data records is provided.

In some embodiments, a computing device configured to automatically redact records captured by recording devices is provided. The computing device is configured to receive a command to redact a data record captured by a recording device; apply a blur filter to the data record to create a redacted data record; store the redacted data record in a staging location; and provide access to redacted data records.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 illustrates an exemplary web interface for generating disclosure requests according to various aspects of the present disclosure;

DETAILED DESCRIPTION

Figure 1:
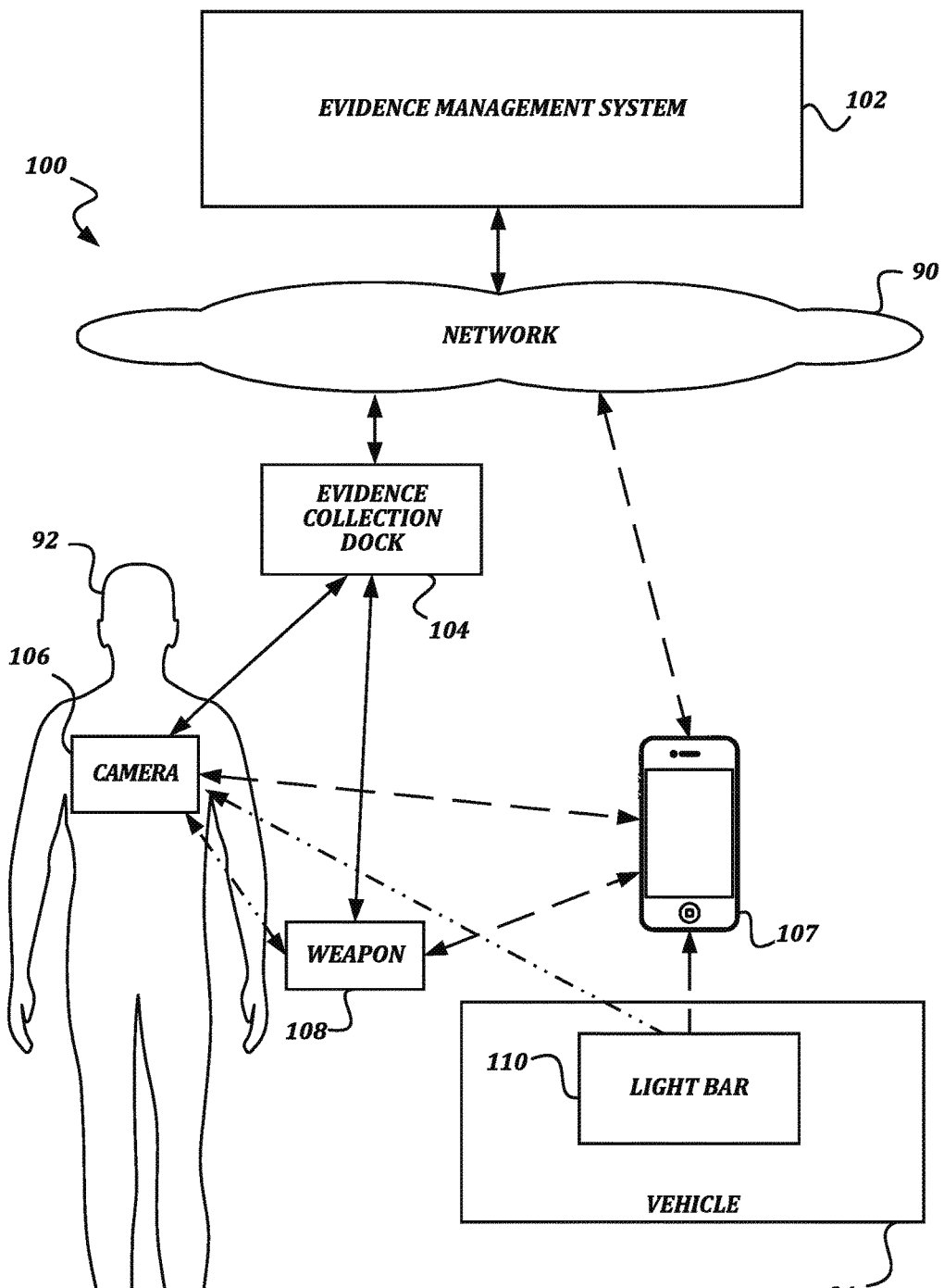
FIG. 1 is a high-level schematic diagram that illustrates communication between various components of an exemplary embodiment of a system according to various aspects of the present disclosure.

FIG. 1 is a high-level schematic diagram that illustrates communication between various components of an exemplary embodiment of a system according to various aspects of the present disclosure. In some embodiments, the system 100 is configured to allow for collection of data records from various recording devices within the system 100, as well as redaction and production of the data records in response to information requests.

In general, a user 92, such as a law enforcement officer, may be associated with one or more recording devices. The devices may include, but are not limited to, a video recording device such as a camera 106, a weapon 108, and various devices associated with a vehicle 94 such as a light bar device 110. The video recording device 106 may be, for example, a wearable camera that records video and/or audio data when activated. The weapon 108 may be, for example, a conducted energy weapon (CEW) that stores data records regarding events such as firing events, cartridge loading, holster removal, and/or the like. The light bar device 110 may detect changes in state such as activation of the light bar on the vehicle 94, which is usually associated with an emergency situation, and store data records regarding the changes in state. Other recording devices, such as a dashboard camera, a heart rate sensor device, a holster sensor device, and/or the like, may also be included in the system 100 but are not illustrated in FIG. 1.

In some embodiments, the recording devices transmit data records to the evidence management system 102 using any suitable technique. In some embodiments, at least some of the recording devices may have long range wireless communication abilities, and may transmit data records to the evidence management system 102 using one or more of a WiFi network; a mobile data network such as LTE, 4G, or 3G; and/or the like. In some embodiments, at least some recording devices may perform a direct long-range transmission or reception of information, such as to an evidence management system 102, when physically connected to an evidence collection dock 104 that communicates with the evidence management system 102 via a broadband network 90 such as a LAN, a WAN, and/or the Internet. In some embodiments, a personal assistant computing device 107 is provided. The personal assistant computing device 107 is illustrated as a smartphone computing device, but in some embodiments may be a laptop computing device, a tablet computing device, or any other suitable computing device capable of being carried by the user 92 or a vehicle 94 associated with the user 92 and capable of performing the actions described herein. The personal assistant computing device 107 may be capable of short-range communication with the other recording devices in the system 100, and may also be capable of long range communication with the evidence management system 102, a dispatch system, or any other system to relay data records from the recording devices to the evidence management system 102. Further aspects of these devices and their capabilities will be discussed below.

Figure 2:
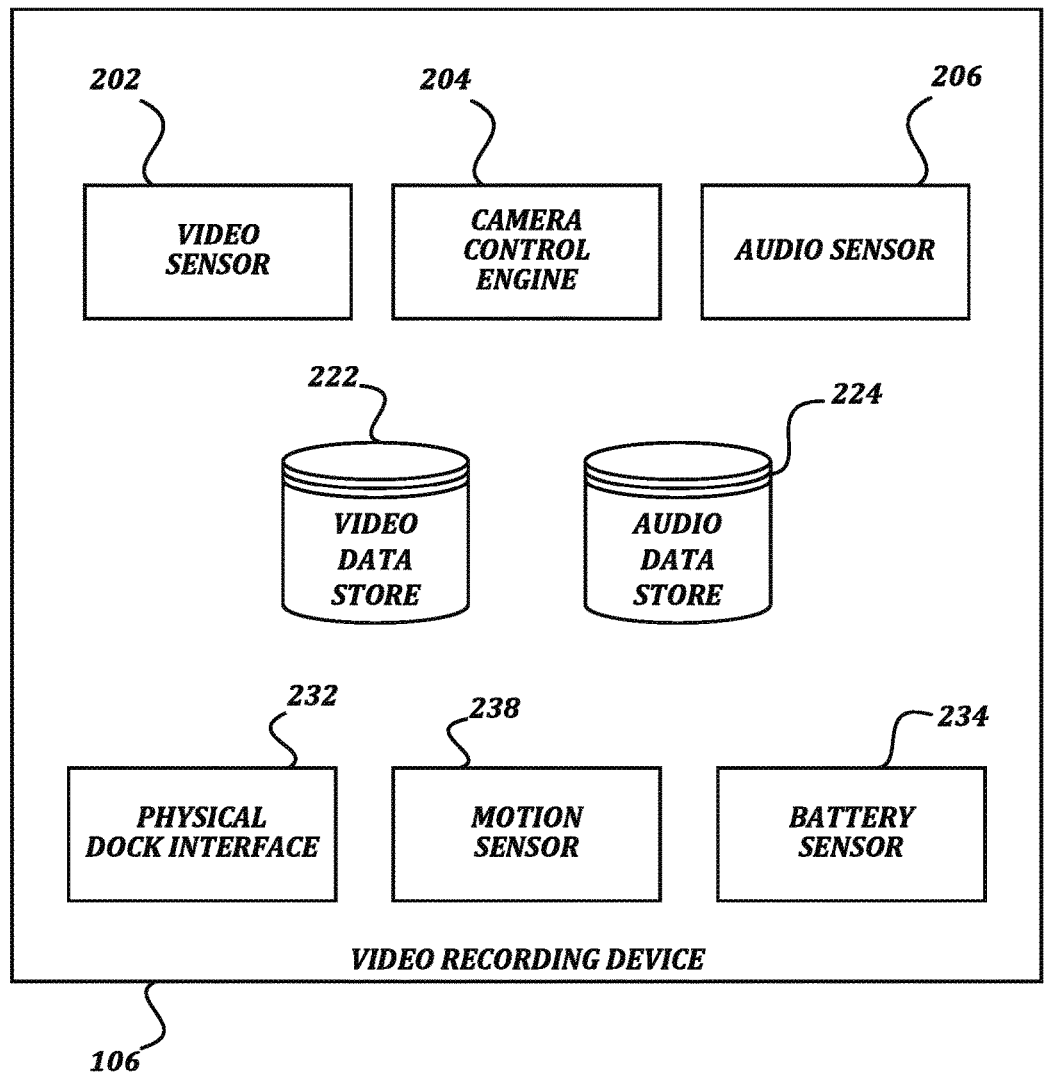
FIG. 2 is a block diagram that illustrates an exemplary embodiment of a data recording device according to various aspects of the present disclosure.

FIG. 2 is a block diagram that illustrates an exemplary embodiment of a data recording device according to various aspects of the present disclosure. In some embodiments, the video recording device 106 is a wearable camera that provides a point of view associated with the user 92. In some embodiments, the video recording device 106 may be attached to another device carried by the user 92, such as a weapon. In some embodiments, the video recording device 106 may be mounted away from the user 92, such as an in-car camera or a security camera.

As with any camera, the video recording device 106 includes at least a video sensor 202, and may also include an audio sensor 206. Data collected by the video sensor 202 and the audio sensor 206 may be stored in a video data store 222 and an audio data store 224, respectively, though in some embodiments the audio and video information is stored together in a single data store and/or in a combined data file. One example of an appropriate video sensor is a charge-coupled device (CCD), though any other digital image sensor, such as a complementary metal-oxide-semiconductor (CMOS) sensor, an active pixel sensor, or any other type of digital image sensor could be used instead. Any type of microphone may be used as an audio sensor 206.

As understood by one of ordinary skill in the art, a "data store" as described herein may be any suitable device configured to store data for access by a computing device. One example of a data store suitable for use with the high capacity needs of the evidence management system 102 is a highly reliable, high-speed relational database management system (RDBMS) executing on one or more computing devices and accessible over a high-speed network. However, any other suitable storage technique and/or device capable of quickly and reliably providing the stored data in response to queries may be used, such as a key-value store, an object database, and/or the like. Further, for the evidence management system 102, the computing device providing the data store may be accessible locally instead of over a network, or may be provided as a cloud-based service. Suitable cloud-based services may be provided as part of the evidence management system 102, or may be provided by a third party cloud storage provider. Some example cloud storage systems include but are not limited to Google Drive, Dropbox, CloudMe, Amazon Cloud Drive, Amazon S3, Microsoft OneDrive, and/or the like.

A data store may also include data stored in an organized manner on a computer-readable storage medium, as described further below. One example of a data store suitable for use with the needs of the video recording device 106, which includes reliable storage but also low overhead, is a file system or database management system that stores data in files (or records) on a computer-readable medium such as flash memory, random access memory (RAM), hard disk drives, and/or the like. One of ordinary skill in the art will recognize that separate data stores described herein may be combined into a single data store, and/or a single data store described herein may be separated into multiple data stores, without departing from the scope of the present disclosure.

The video recording device 106 also includes a camera control engine 204. In general, the term "engine" as used herein refers to logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. An engine may be compiled into executable programs or written in interpreted programming languages. Engines may be callable from other engines or from themselves. Generally, the engines described herein refer to modules that can be merged with other engines to form a single engine, or can be divided into multiple sub-engines. The engines may be embodied in any type of circuit such as an FPGA or an ASIC; and/or may be stored in any type of computer-readable medium or computer storage device and be stored on and executed by one or more general purpose computers, thus creating a special purpose computer configured to provide the engine. Accordingly, the devices and systems illustrated herein include one or more computing devices configured to provide the illustrated engines, though the computing devices themselves have not been illustrated in every case for the sake of clarity.

The camera control engine 204 is configured to change settings of the video recording device 106 and thereby cause the video recording device 106 to perform camera functions. For example, the camera control engine 204 may cause the video sensor 202 and audio sensor 206 to begin obtaining data, and may cause the video and/or audio data to be saved in a video data store 222 and/or audio data store 224 after receiving it from the sensor. The camera control engine 204 may receive commands to start, pause, or stop the video recording from a physical user interface device of the video recording device 106, or may automatically start, pause, or stop the video recording in response to an instruction received from, for example, a short-range wireless interface. The camera control engine 204 may also change settings on the video sensor 202 and/or audio sensor 206 in response to such instructions, such as an image quality, a white balance setting, a gain, and/or any other video or audio recording setting. Starting video recording may include transitioning from a pre-trigger mode, wherein video data and/or audio data is saved in a pre-trigger buffer such as a ring buffer, to a post-trigger mode wherein video data and/or audio data is saved in the video data store 222 and/or the audio data store 224. Likewise, stopping video recording may include transitioning from the post-trigger mode to the pre-trigger mode.

The video recording device 106 may also include a number of general components, including a motion sensor 238, a physical dock interface 232, and a battery sensor 234. The motion sensor 238, such as a multi-axis accelerometer, produces motion information reflecting motion of the video recording device 106. The battery sensor 234 may generate information regarding a state of a battery of the video recording device 106. For example, the battery sensor 234 may detect a low battery state, a battery overheating state, and/or the like. Other well-known internal device systems, such as a file system controller, a free-fall sensor, and/or the like, may similarly provide alerts to the notification generation engine 204, but are not illustrated here. In some embodiments, the camera control engine 204 may embed information from the general components, sensor configuration information, or other information about the state of the video recording device 106 in the data or metadata stored in the video data store 222 and/or audio data store 224. In some embodiments, the camera control engine 204 may store information regarding the state of the video recording device 106 in another data store that is not illustrated.

The physical dock interface 232 is configured to mate with a physical connector on the evidence collection dock 104. In some embodiments, the physical dock interface 232 may include a female 2.5 mm socket, which mates with a male 2.5 mm plug of the evidence collection dock 104. Once docked, the video recording device 106 may then transfer data to the evidence management system 102 via the connection using any suitable data transmission protocol. In some embodiments, power may be transferred to the video recording device 106 via the physical dock interface 232 instead of or in addition to the data transfer. In some embodiments, other connection hardware that can provide both power and data connectivity may be used, such as a USB connector, a USB Type-C connector, a Firewire connector, and/or the like. Though not illustrated, the video recording device 102 may also include a short-range wireless interface. The short-range wireless interface may be configured to use any suitable wireless networking technology capable of wirelessly exchanging data with other devices within range of the video recording device 102, including but not limited to Bluetooth (including Bluetooth Low Energy), ZigBee, NFC, and/or the like.

FIG. 2 illustrates a video recording device 106, but one of ordinary skill in the art will recognize that other types of recording devices will have similar components. For example, an audio-only recording device may be very similar to the video recording device 106, but will simply lack the video-related components. As another non-limiting example, a heart rate monitor recording device would have a heart rate sensor and a heart rate record data store instead of audio or video components, but would otherwise have similar components for interacting with the system 100.

Figure 3:
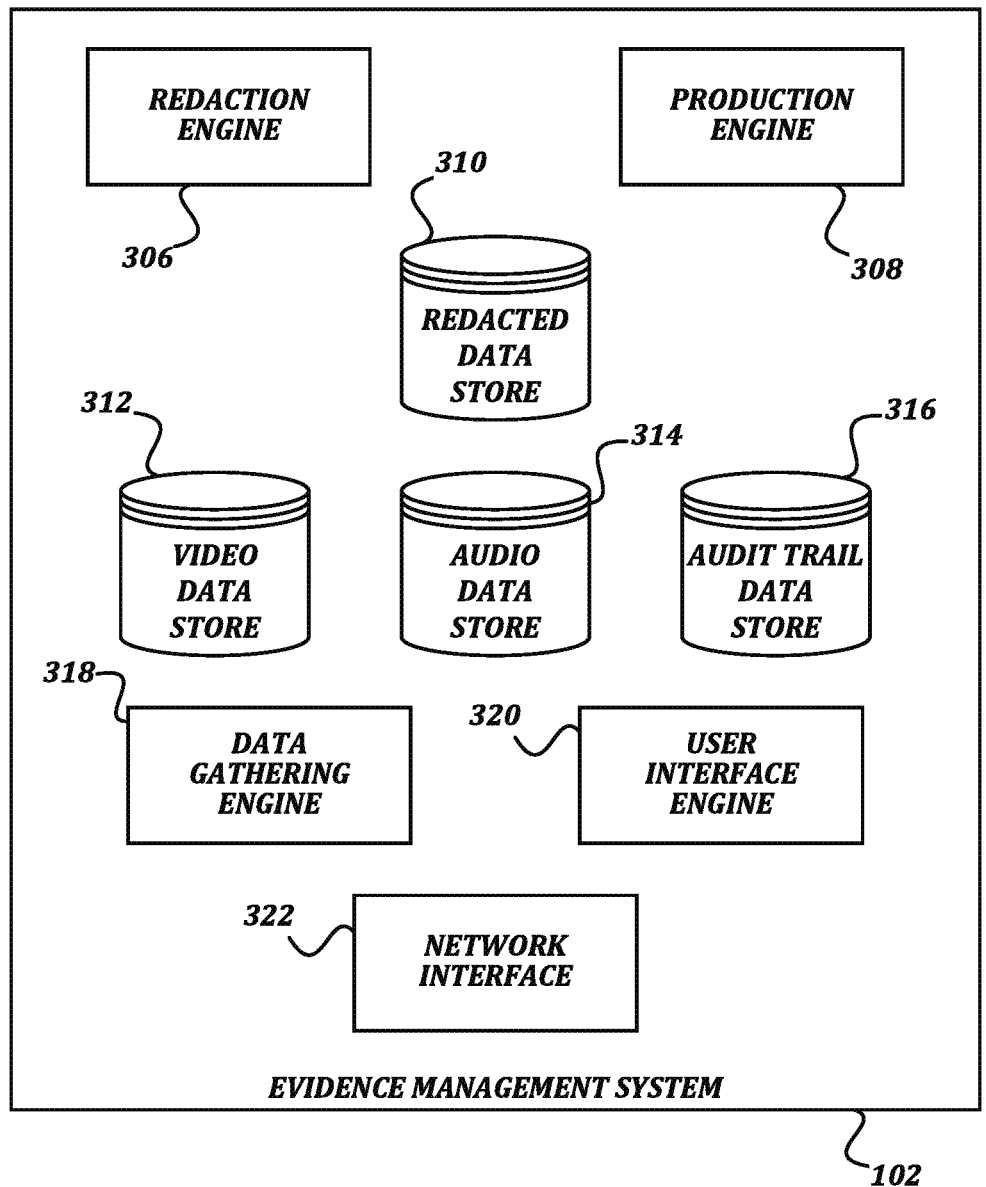
FIG. 3 is a block diagram that illustrates an exemplary embodiment of an evidence management system according to various aspects of the present disclosure.

FIG. 3 is a block diagram that illustrates an exemplary embodiment of an evidence management system according to various aspects of the present disclosure. In some embodiments, the evidence management system 102 comprises a plurality of computing devices configured to provide the illustrated components, though they are described as a single system for clarity. One of ordinary skill in the art will recognize that any suitable server system, such as a single server, a server farm, a cloud service, and/or the like, may be used to provide the functionality of the evidence management system 102.

As illustrated, the evidence management system 102 includes a redaction engine 306, a production engine 308, and a network interface 322. The redaction engine 306 is configured to process data records and remove or otherwise obfuscate sensitive information. The production engine 308 is configured to receive requests for data records, and to provide access to the requested data records after they have been processed by the redaction engine 306. Further description of these processes is provided below.

The evidence management system 102 also includes a redacted data store 310, a video data store 312, an audio data store 314, and an audit trail data store 316. The video data store 312 and audio data store 314 are configured to store data captured by one or more video recording devices 106 or other devices that can capture audio and/or video data and are enrolled with the system 100. In some embodiments, the video data store 312 and audio data store 314 are merged into a single data store, and audio and video data that are recorded contemporaneously may be stored together in a single file. The audit trail data store 316 stores records of auditable events detected by devices of the system 100, such as other types of device status information captured by recording devices. In some embodiments, other data stores for other types of data records, such as a heart rate data store for heart rate data records, a location data store for location data records, and/or other types of data stores and data records, may also be included.

In some embodiments, the redacted data store 310 provides a staging location for data records that are either about to be redacted or that have been redacted but have not yet been produced. While illustrated as part of the evidence management system 102, in some embodiments the redacted data store 310 may be external from the evidence management system 102 and accessible via a network, such as a cloud storage system and/or the like.

The evidence management system 102 also includes a data gathering engine 318 and a user interface engine 320. The data gathering engine 318 is configured to receive video data, audio data, and/or other information from devices via the evidence collection dock 104 and the coordinator computing device 107. The user interface engine 320 is configured to generate and present user interfaces for displaying and interacting with the data collected by the evidence management system 102 via web pages, application programming interfaces, or any other suitable technology. Each of the interfaces and engines of the evidence management system 102 is configured to use a network interface 322 for communication with other components of the system 100 via the Internet. Further description of the actions taken by the components of the evidence management system 102 is provided below.

Figure 4A:
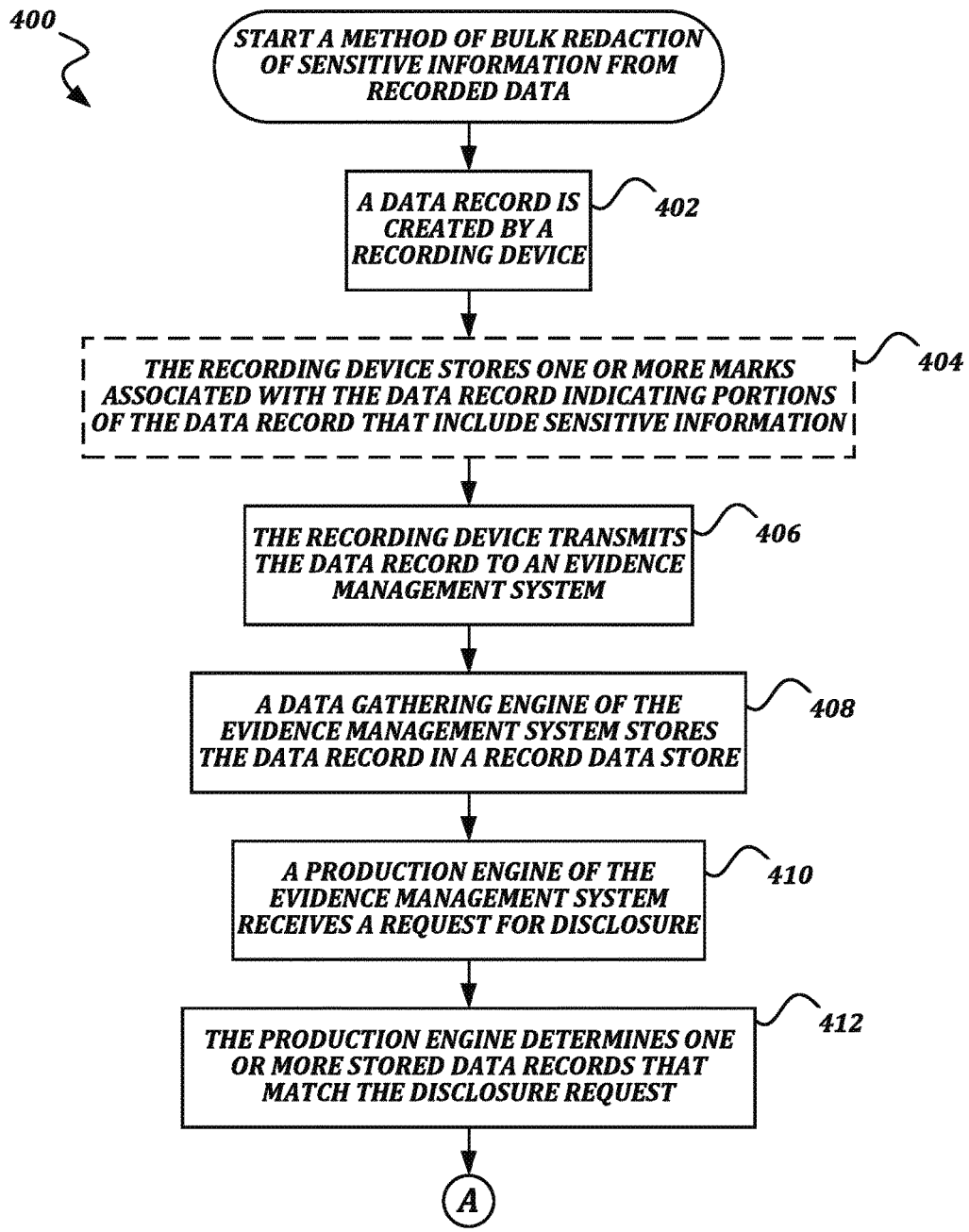
FIGS. 4A-4B are a flowchart that illustrates an exemplary embodiment of a method of bulk redaction of sensitive information from recorded data according to various aspects of the present disclosure.
Figure 4B:
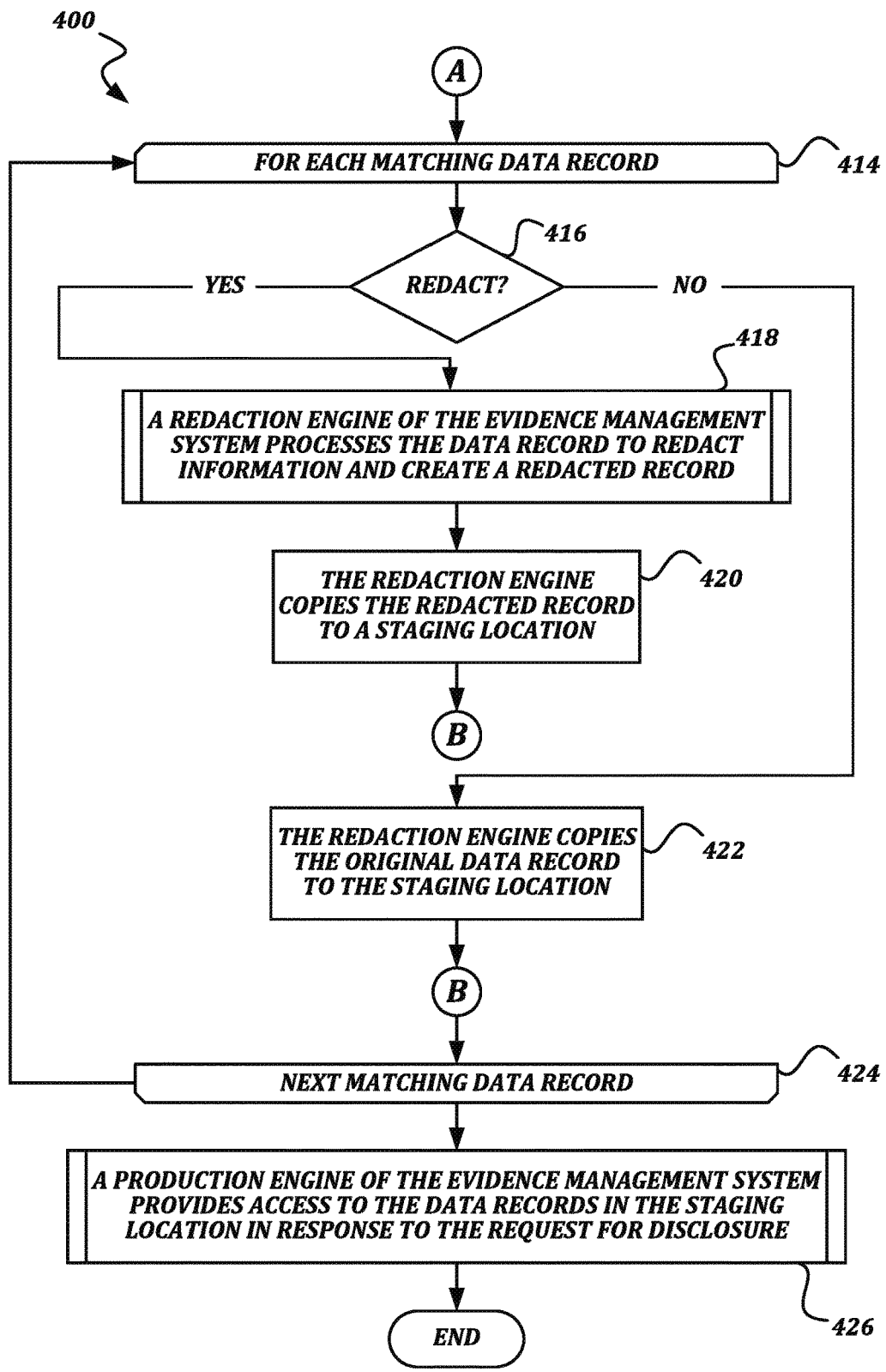

FIGS. 4A-4B are a flowchart that illustrates an exemplary embodiment of a method of bulk redaction of sensitive information from recorded data according to various aspects of the present disclosure. From a start block, the method 400 proceeds to block 402, where a data record is created by a recording device. The data record includes information gathered by a sensor of the recording device. For example, if the recording device is a video recording device 106, the data record includes video and/or audio information, and is stored in the video data store 222 and/or audio date store 224 of the video recording device 106. As another example, for a location monitoring device, the data record includes location information, which would be stored in a data store of the location monitoring device.

The method 400 then proceeds to optional block 404, where the recording device stores one or more marks associated with the data record indicating portions of the data record that include sensitive information. Such marks may be useful if not all data records collected by the recording device are assumed to include sensitive information, as they can be used to mark sensitive record data contemporaneously with the creation of the data records in order to avoid the need for subsequent manual review and marking. In some embodiments, the marks may be generated by actuating an interface device such as a button, switch, touchpad, and/or the like on the recording device. In some embodiments, the marks may be generated automatically by the recording device using voice recognition, face recognition, motion information, gunshot detection information, vehicle sensor information, license plate detection information, text detection information, and/or any other suitable technique. In some embodiments, the marks themselves may be stored in the data records themselves, and/or may be stored in metadata of a video data record stored in the video data store 222. In some embodiments, a separate data store may be present on the recording device to store the marks. In some embodiments, the marks indicate a portion in a visual field of video data in which sensitive information exists. In some embodiments, the marks may not indicate a portion in the visual field of the video data in which sensitive information exists, but instead indicate time periods during which sensitive information is present in the data record. Block 404 is illustrated as optional because some embodiments may not use such marks, and may instead just assume that all record data includes sensitive information.

At block 406, the recording device transmits the data record to an evidence management system 102. As discussed above, the data record may be transmitted from the recording device to the evidence management system 102 through an evidence collection dock 104, directly from the recording device to the evidence management system 102 through a wireless network connection such as WiFi, 3G, 4G, LTE, Bluetooth, and/or the like, or by any other suitable technique. At block 408, a data gathering engine 318 of the evidence management system 102 stores the data record in a record data store. As illustrated, information from video data records may be stored in the video data store 312 and/or audio data store 314, information about recording device status may be stored in an audit trail data store 316, and so on for other types of data records. One of ordinary skill in the art will recognize that in some embodiments, the above steps of creating data records, storing marks, transmitting the data records, and storing the data records in a record data store may be repeated for a given recording device, or for multiple recording devices.

At block 410, a production engine 308 of the evidence management system 102 receives a request for disclosure, and at block 412, the production engine 308 determines one or more stored data records that match the disclosure request. A typical request may be related to a Freedom of Information Act (FOIA) request or other public records request. The request may be in a standard form, which may be submitted directly to the production engine 308 via an application programming interface (API). In some embodiments, a request for disclosure based on the FOIA request (or other public records request) may be generated or otherwise entered through a web interface presented by the user interface engine 320 of the evidence management system 102.

FIG. 5 illustrates an exemplary web interface for generating disclosure requests according to various aspects of the present disclosure. As shown, the web interface 500 includes a search parameter pane 502 that allows a user to specify various parameters to query from the data stores in the evidence management system 102. Such parameters may include any suitable criteria, including, but not limited, to being on a given date or within a given date range; being associated with an incident identifier; being associated with a particular recording device; being associated with a particular user; being associated with a particular location; keywords present in a title, description, or textual transcript; and/or any other suitable criteria. Results that match the parameters specified in the search parameter pane 502 are then displayed in a result list 504.

Returning to FIG. 4A, the method 400 then proceeds to a continuation terminal ("terminal A"). From terminal A (FIG. 4B), the method 400 proceeds to a for loop defined between a for loop start block 414 and a for loop end block 424, wherein each of the data records matching the disclosure request is processed by a redaction engine to remove sensitive information, where appropriate. From the for loop start block 414, the method 400 proceeds to a decision block 416, where a determination is made regarding whether the data record being processed should be redacted. The determination could be based on any suitable criteria. For example, the determination could be based on whether the data record is marked as discussed above with respect to optional block 404. As another example, the determination could be based on a selection in an interface used to request the data records, such as the individual item checkboxes in the list 504 or the audio redaction checkbox 506 illustrated in FIG. 5. As another example, the determination could be based on a system default configuration based on the type of information in the data record (e.g., video data records get redacted; heart rate data records do not get redacted; location information data records get redacted only if they are during off-time, and so on).

If the determination indicates that the data record should be redacted, then the result of decision block 416 is YES, and the method 400 proceeds to procedure block 418, where a redaction engine 306 of the evidence management system 102 processes the data record to redact information and create a redacted record.

Figure 6A:
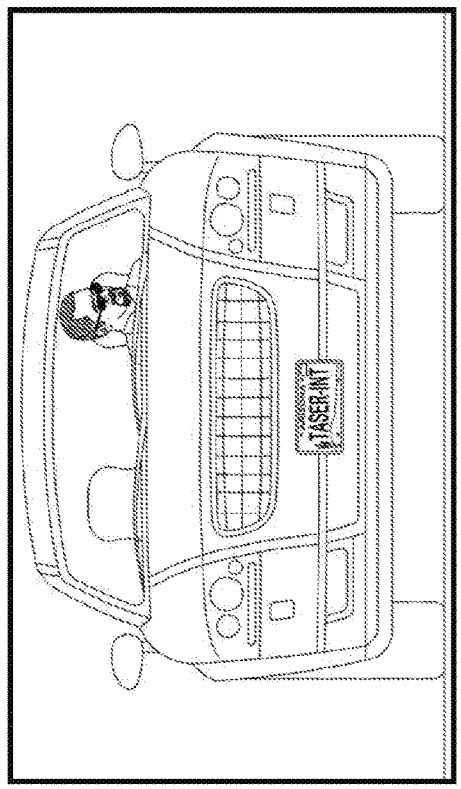
FIGS. 6A and 6B are illustrations of a detailed redaction according to various aspects of the present disclosure.
Figure 6B:
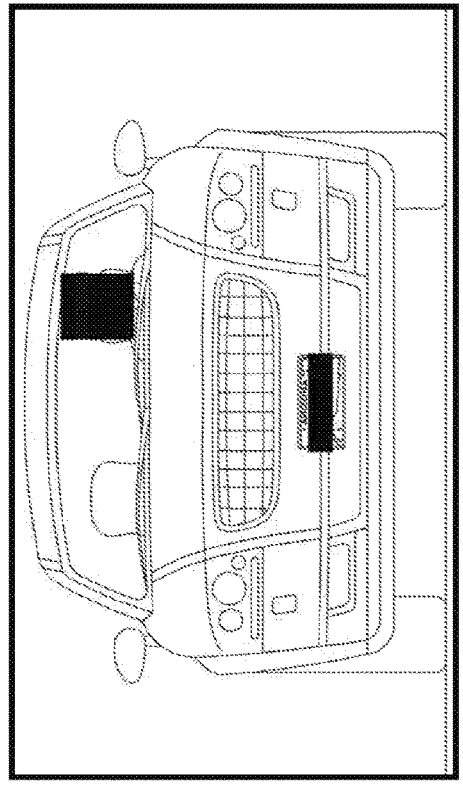

Any suitable procedure may be used in procedure block 418. For example, in some embodiments, a detailed redaction of video data may be performed. FIGS. 6A and 6B are illustrations of a detailed redaction according to various aspects of the present disclosure. FIG. 6A shows a representative still from a video scene. In the scene a face of a driver and a license plate are visible. In this scene, the driver's identity and the license plate number may be considered sensitive information. FIG. 6B shows the representative still of the video scene after a detailed redaction has taken place. Solid color boxes have been placed over the sensitive information, such that it is no longer visible.

The detailed redaction may be conducted through an interface provided by the user interface engine 320. The interface may provide a user the ability to watch the video and apply the color blocks or other vector mask to the video information, and to mute audio (or apply a covering beep) to hide any sensitive audio information. The interface may also include other tools to simplify the redaction process, including auto-generating thumbnails of the videos to speed navigation, a scrub bar to skip through the video, a timeline that displays markings as discussed above, a waveform display of the audio, and/or other techniques. In some embodiments, the redaction engine 306 may apply color blocks or redaction portions of the audio automatically, using techniques such as speech-to-text (to find sensitive audio), facial recognition (to find faces to be redacted), license plate detection (to find license plates to be redacted), optical character recognition (OCR) (to find text to be redacted), and/or the like.

Figure 7A:
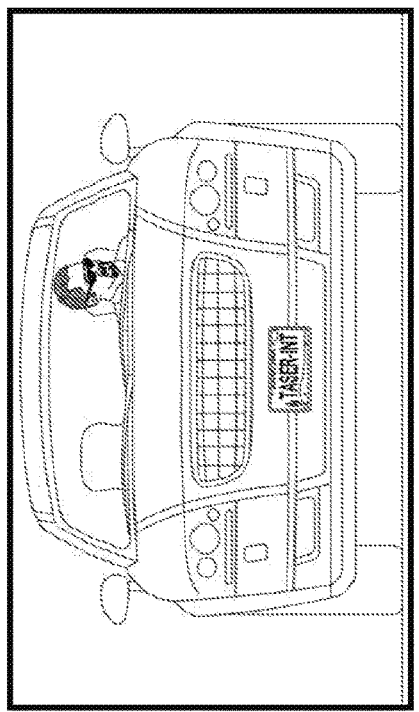
FIGS. 7A, 7B, and 7C are illustrations of a bulk redaction technique according to various aspects of the present disclosure.
Figure 7C:
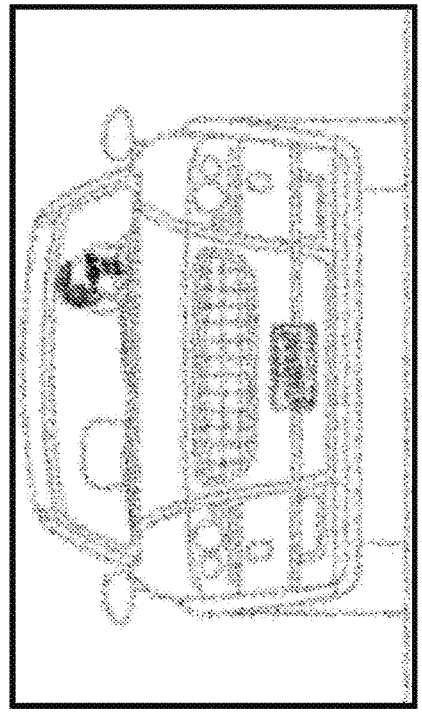
Figure 7B:
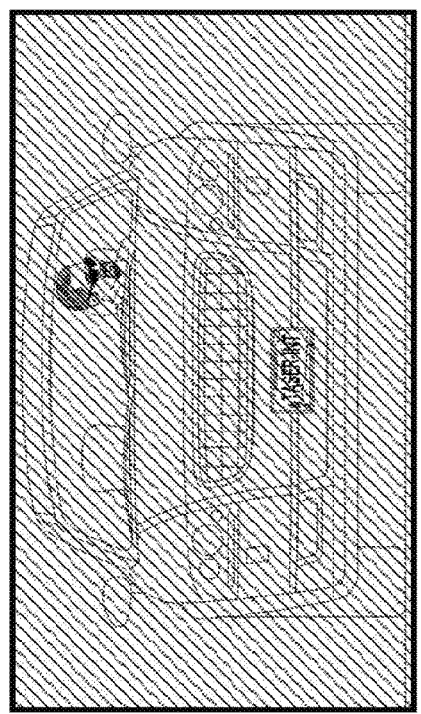

As another example, FIGS. 7A, 7B, and 7C are illustrations of a bulk redaction technique according to various aspects of the present disclosure. Bulk redaction allows a large number of data records to be processed without having to individually analyze each data record or other manual user intervention. FIG. 7A again shows a representative still from a video scene. As before, the video scene includes a face of an individual and a license plate number, both of which would be considered sensitive information. FIG. 7B shows, with diagonal lines, an area of the video image to which a redaction filter is applied. In other words, an entire visible area of the video image is altered with a video filter in order to obfuscate the information therein. While this over-inclusive processing does obfuscate information that is not sensitive, such as the color and make of the car, any background details, and/or the like, it guarantees that any visible sensitive information will be obfuscated no matter the position at which it is located within the video frame.

In some embodiments, the filter used for redaction may be a video filter such as a blur filter. FIG. 7C shows the representative still with a blur filter applied to the entire visible area. In some embodiments, a blur filter is selected because it can be configured to remove enough detail so that sensitive information such as faces, writing, etc., are not presented in an identifiable format, but also to leave enough information so that the general idea of what is happening can be determined. Such a filter also allows the filter to be applied to entire visible area, thus ensuring that any included sensitive information within the visible area is not legible. In some embodiments, other filters that achieve similar results, such as a Gaussian blur filter, a pixelization filter, or other detail-reducing filters may be used.

Using such a filter allows for the automated redaction of video data, and saves significant processing time when producing large numbers of requested data records. Further, such a technique should be acceptable to the requester: if the subject of the video image in FIG. 7C left the car and was detained by a law enforcement officer, the rough idea of this interaction would be communicated even through the redaction filter, and if the requester therefore wanted further details about the interaction, a less-redacted video (such as a manually redacted video) could be requested. Meanwhile, if the subject did not exit the car and no significant interactions took place, the requester may be able to tell that nothing of interest happened during the video and would not request a less-redacted video.

In some embodiments, audio information included in the video may be affected by bulk redaction as well. In some embodiments, all audio information may be removed during bulk redaction. The blurred video information should provide enough to allow a requestor to determine whether the audio information would be helpful and should be requested in a less-redacted record. In some embodiments, a waveform or sound level indicator may be superimposed on the video even after the audio information is removed to give some idea of the level of sound in the video. Whether or not the audio information is removed during bulk redaction may be based on a general user configuration or a selection such as checkbox 506 in the web interface 500.

Returning to FIG. 4B, after the data record has been redacted at procedure block 418, the method 400 proceeds to block 420, where the redaction engine 306 copies the redacted record to a staging location. In some embodiments, the staging location may be local to the evidence management system 102, such as the redacted data store 310. In some embodiments, the staging location may be a location in a cloud storage service or other server that is protected by credentials that are not distributed to users outside of the evidence management system 102. The method 400 then proceeds to a continuation terminal ("terminal B").

Returning to decision block 416, if the determination indicates that the data record should not be redacted, then the result of decision block 416 is NO, and the method proceeds to block 422, where the redaction engine 306 copies the original data record to the staging location. In some embodiments, the original data record may be copied to the same staging location as the redacted records, because it has been determined that no redaction is needed from this particular original data record before becoming public. The method 400 then proceeds to a continuation terminal ("terminal B"). From terminal B, the method 400 proceeds to the for loop end block 424. If further matching data records exist, then the method 400 returns to the for loop start block 414 to process the next matching data record. Otherwise, if all matching data records have been processed, the method 400 advances to procedure block 426, where a production engine 308 of the evidence management system 102 provides access to records in the staging location in response to the request for disclosure. The method 400 then proceeds to an end block and terminates.

Any suitable procedure may be used in procedure block 426 to provide access to the data records in the staging location. As one non-limiting example, the production engine 308 may copy the data records from the staging location to a server location accessible by users outside of the evidence management system 102. The production engine 308 may then generate and/or provide a link to that server location to the requester. The server location may be on a file server, an FTP server, a cloud storage system, or any other suitable server. In some embodiments, the server location may require authentication for access, such as by using a username and/or password, shared authentication (such as OAuth, OpenID, Facebook Connect, and/or the like), and/or any other suitable authentication technique, such that the location is not accessible to the public as a whole, but may nevertheless be accessed by the requester when not affiliated with the evidence management system. In some embodiments, the production engine 308 may compress and/or combine data records before copying them to the server location using any suitable format or technique. Some example formats and/or techniques for file and data combination and compression include ZIP format, tar format, CAB format, Apple Disk Image format, MPEG compression, JPEG compression, FLAC compression, and the like. One of ordinary skill in the art is capable of selecting and applying one or more of these techniques or others to process the data records before copying them to the server location.

As another non-limiting example, the production engine 308 may copy the data records to a removable computer-readable medium to be delivered to the requester. For example, the production engine 308 may cause the data records to be stored on an optical storage medium such as a CD-ROM, DVD-ROM, and/or the like. Accordingly, the production engine 308 may combine data records in the staging location to create an optical disk image such as an ISO image and/or the like. The production engine 308 may then cause a disk burning system or device to write the optical disk image to an appropriate optical disk for delivery to the requester. In some embodiments, the production engine may combine and/or compress the data records as discussed above before the compressed/combined files are added to the optical disk image.

Figure 8:
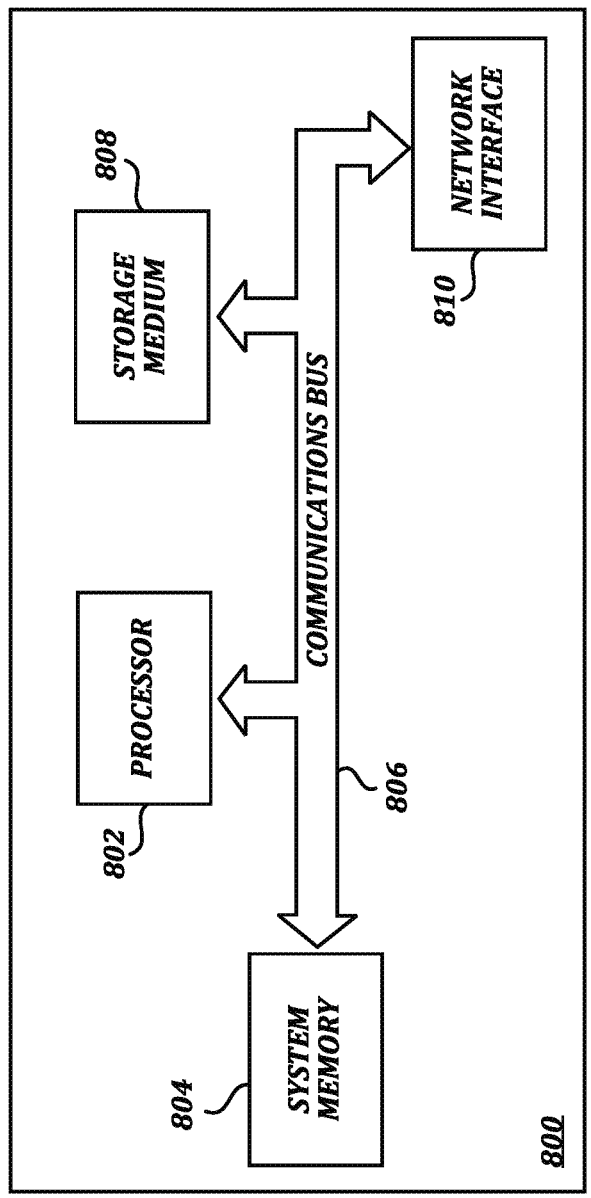
FIG. 8 is a block diagram that illustrates aspects of an exemplary computing device appropriate for use as a computing device of the present disclosure.

FIG. 8 is a block diagram that illustrates aspects of an exemplary computing device appropriate for use as a computing device of the present disclosure. While multiple different types of computing devices were discussed above, the exemplary computing device 800 describes various elements that are common to many different types of computing devices. While FIG. 8 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 800 may be any one of any number of currently available or yet to be developed devices.

In its most basic configuration, the computing device 800 includes at least one processor 802 and a system memory 804 connected by a communication bus 806. Depending on the exact configuration and type of device, the system memory 804 may be volatile or nonvolatile memory, such as read only memory ("ROM"), random access memory ("RAM"), EEPROM, flash memory, or similar memory technology. Those of ordinary skill in the art and others will recognize that system memory 804 typically stores data and/or program modules that are immediately accessible to and/or currently being operated on by the processor 802. In this regard, the processor 802 may serve as a computational center of the computing device 800 by supporting the execution of instructions.

As further illustrated in FIG. 8, the computing device 800 may include a network interface 810 comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols, such as WiFi, 2G, 3G, LTE, WiMAX, Bluetooth, and/or the like. As will be appreciated by one of ordinary skill in the art, the network interface 810 illustrated in FIG. 8 may represent one or more wireless interfaces or physical communication interfaces described and illustrated above with respect to particular components of the system 80.

In the exemplary embodiment depicted in FIG. 8, the computing device 800 also includes a storage medium 808. However, services may be accessed using a computing device that does not include means for persisting data to a local storage medium. Therefore, the storage medium 808 depicted in FIG. 8 is represented with a dashed line to indicate that the storage medium 808 is optional. In any event, the storage medium 808 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 804 and storage medium 808 depicted in FIG. 8 are merely examples of computer-readable media.

Suitable implementations of computing devices that include a processor 802, system memory 804, communication bus 806, storage medium 808, and network interface 810 are known and commercially available. For ease of illustration and because it is not important for an understanding of the claimed subject matter, FIG. 8 does not show some of the typical components of many computing devices. In this regard, the computing device 800 may include input devices, such as a keyboard, keypad, mouse, microphone, touch input device, touch screen, tablet, and/or the like. Such input devices may be coupled to the computing device 800 by wired or wireless connections including RF, infrared, serial, parallel, Bluetooth, USB, or other suitable connections protocols using wireless or physical connections. Similarly, the computing device 800 may also include output devices such as a display, speakers, printer, etc. Since these devices are well known in the art, they are not illustrated or described further herein.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". The invention includes any practical combination of the structures and methods disclosed. While for the sake of clarity of description several specifics embodiments of the invention have been described, the scope of the invention is intended to be measured by the claims as set forth below.

What is claimed is:

1. A system for processing digital video data, the system comprising:
  at least one digital video camera; and
  an evidence management system comprising at least one computing device, the evidence management system configured to:
    receive multiple digital video files from the at least one digital video camera;
    store the multiple digital video files in a storage location protected from public access;
    receive a request for disclosure;
    match the request for disclosure with data records stored in the storage location protected from public access, the matching data records including one or more digital video files of the multiple digital video files;
    display the matching data records on a display associated with the evidence management system;
    receive one or more selections of one or more of the displayed matching data records, the one or more selections received via a user interface associated with the evidence management system;

create one or more redacted digital video files by applying a blur filter to obfuscate an entirety of visual content of the one or more digital video files of the multiple digital video files, wherein the one or more redacted digital video files are created in accordance with the received one or more selections; and store the one or more redacted digital video files in a storage location available to public access.

2. The system of claim 1 wherein each of the matching data records is associated with an incident identifier specified in the request for disclosure.

3. The system of claim 1 wherein the matching data records are associated with a keyword specified in the request for disclosure, the keyword being found in a title, a description, or a textual transcript associated with each of the matching data records.

4. The system of claim 1 wherein creating the one or more redacted digital video files includes automatically applying the blur filter to each of the multiple digital video files, the application of the blur filter obfuscating an entirety of visual content of each of the multiple digital video files.

5. The system of claim 1 wherein the evidence management system is further configured to:

present a web interface including a list of the multiple digital video files;

receive, via the web interface, one or more selections of one or more digital video files on the list; and apply the blur filter to the one or more digital video files selected via the web interface.

6. A computer-implemented method for automatically redacting records captured by recording devices during law enforcement activities, the method performed by a computing device, the method comprising:

receiving a request for disclosure;

determining data records in a record data store that match the request for disclosure, the matching data records including at least a first data record and a second data record;

redacting the matching data records to create redacted data records, wherein the redacting includes:

applying a blur filter to a first digital video file included in the first data record, the blur filter obfuscating visual information in the first digital video file; and automatically applying the blur filter to a second digital video file included in the second data record, the blur filter obfuscating visual information in the second digital video file, wherein automatically applying the blur filter to the second digital video file comprises automatically applying the blur filter to the second digital video file after the blur filter has been applied to the first digital video file;

storing the redacted data records in a staging location; and providing access to the redacted data records.

7. The method of claim 6 wherein:

receiving the request for disclosure comprises receiving an incident identifier; and determining the data records that match the request for disclosure comprises determining the data records in the record data store associated with the incident identifier.

8. The method of claim 6 wherein:

receiving the request for disclosure comprises receiving search parameter data including a given date, a given date range, a particular recording device, a particular location, or a particular user; and determining the data records that match the request for disclosure comprises determining the data records in the record data store associated with the search parameter data.

9. The method of claim 6 wherein:

receiving the request for disclosure comprises receiving keyword data; and determining the data records that match the request for disclosure comprises determining each data record in the record data store in which the keyword data is present in title, description, or textual transcript data of the data record.

10. The method of claim 6 wherein:

applying the blur filter to first digital video file includes applying the blur filter to an entire visual field of the first digital video file; and automatically applying the blur filter to second digital video file includes applying the blur filter to an entire visual field of the second digital video file.

11. The method of claim 6 further comprising presenting a web interface to a user, the web interface includes:

a list of the matching data records; and interface elements for submitting commands to redact data records in the list of the matching data records.

12. A computing device configured to automatically redact data records captured by recording devices during law enforcement activities by:

receiving a disclosure request;

determining a plurality of data records that match the disclosure request, the plurality of records including a first data record and a second data record captured by one or more recording devices;

presenting a web interface to a user, the web interface including a list of the plurality of data records determined to match the disclosure request;

generating a list of data records to be redacted, the data records including the first data record and the second data record;

processing each of the data records in the list for redaction, the processing including:

applying a blur filter to the first data record to create a first redacted data record, the first redacted data record including visible information obfuscated by the application of the blur filter;

storing the first redacted data record in a staging location;

automatically applying the blur filter to the second data record to create a second redacted data record, the second data record included in the generated list of data records prior to application of the blur filter to the first data record; and storing the second redacted data record in the staging location with the first redacted data record; and providing access to the first redacted data record and the second redacted data record.

13. The computing device of claim 12 wherein receiving the disclosure request comprises:

receiving one of an incident identifier, a particular recording device, or a particular user; and determining the plurality of data records that match the disclosure request comprises determining data records in a record data store that are associated with the incident identifier, the particular recording device, or the particular user.

14. The computing device of claim 12 wherein the blur filter is applied to an entire visible area of a video image of the first data record to create the first redacted data record.

15. The computing device of claim 12 wherein processing each of the data records in the list for redaction comprises removing location information from each of the first data record and the second data record.

16. The computing device of claim 12 wherein processing each of the data records in the list comprises redacting the data records in accordance with one or more marks associated with each data record in the list, the one or more marks indicating one or more portions of the associated data record that include sensitive information.

17. The computing device of claim 16 wherein the one or more marks are generated automatically by a recording device on which the sensitive information was recorded.

18. The method of claim 6 wherein the blur filter is applied to the second digital video file by the computing device in accordance with one or more stored marks associated with the second data record, the one or more marks indicating:
   one or more portions in a visual field of video data of the second digital video file in which sensitive information exists; or
   one or more time periods during which sensitive information is present in the second data record.

19. The method of claim 18 wherein the one or more stored marks were generated automatically on a wearable camera on which the second data record was recorded.

20. The computing device of claim 17 wherein the one or more marks indicate one or more portions in a visual field of video data of the associated data record in which the sensitive information exists.

* * * * *